United States Patent
Fujiki et al.

(10) Patent No.: US 7,387,101 B2
(45) Date of Patent: Jun. 17, 2008

(54) OIL PAN FOR ENGINE HAVING A SHIELD MEMBER COVERING AN AIR HOLE OF AN OIL SENSOR

(75) Inventors: Kenji Fujiki, Saitama (JP); Osamu Murakami, Saitama (JP); Masayuki Ueno, Saitama (JP); Masaki Kanehiro, Saitama (JP); Seiji Kosaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/517,585

(22) Filed: Sep. 8, 2006

(65) Prior Publication Data
US 2007/0056549 A1    Mar. 15, 2007

(30) Foreign Application Priority Data
Sep. 9, 2005    (JP)    ............... 2005-261587

(51) Int. Cl.
*F01M 11/10*    (2006.01)
*F02B 77/00*    (2006.01)
*F02B 75/06*    (2006.01)
*G01N 33/26*    (2006.01)

(52) U.S. Cl. .............. 123/195 C; 123/196 S; 123/192.2; 73/53.05; 340/450.3

(58) Field of Classification Search ............ 123/195 C, 123/195 H, 196 A, 196 AB, 196 R, 196 S, 123/198 D, 198 E, 198 DE, 192.2; 340/450.3; 73/53.05, 290 R, 295, 304 R
See application file for complete search history.

(56) References Cited

U.S. PATENT DOCUMENTS

| 4,300,493 | A | * | 11/1981 | Berti | ............... | 123/192.2 |
| 4,703,724 | A | * | 11/1987 | Candea et al. | ............ | 123/192.2 |
| 5,535,643 | A | * | 7/1996 | Garza | ............... | 74/603 |
| 5,960,908 | A | * | 10/1999 | Kasahara | ............. | 184/106 |
| 6,725,974 | B2 | * | 4/2004 | Sato et al. | ............. | 184/106 |

FOREIGN PATENT DOCUMENTS

| JP | 11-30115 A | 2/1999 |
| JP | 2003-83935 A | 3/2003 |
| KR | 10-2004-0041874 A | * 5/2004 |

* cited by examiner

*Primary Examiner*—Stephen K. Cronin
*Assistant Examiner*—Ka Chun Leung
(74) *Attorney, Agent, or Firm*—Arent Fox LLP

(57) ABSTRACT

An oil level sensor for detecting an oil level is arranged in an engine oil pan. The oil level sensor includes a mounting section and a sensing section. An air hole is formed at an upper end of a cover member of the sensing section. The air hole is surrounded by a tubular portion of a shield member attached to a baffle plate of the oil pan. Therefore, any splashed engine oil in the oil pan is restricted from entering the cover member of the sensing section through the air hole. Also, a clearance ($\alpha$) for venting air is formed between the tubular portion and the baffle plate.

11 Claims, 3 Drawing Sheets

OIL PAN FOR ENGINE HAVING A SHIELD MEMBER COVERING AN AIR HOLE OF AN OIL SENSOR

RELATED APPLICATION DATA

The present invention is based upon Japanese priority application No. 2005-261587, which is hereby incorporated in its entirety herein by reference.

BACKGROUND OF THE INVENTION

1. Field of the Invention

The present invention relates to an oil pan for an engine located below a cylinder block of the engine to store engine oil and in which an oil sensor for detecting a parameter of the engine oil is disposed.

2. Description of the Related Art

Japanese Patent Application Laid-open No. 2003-83935 (JP '935) discloses an oil pan having an oil deterioration sensor in a bottom portion thereof for determining a time to change the engine oil for an automobile engine. The oil deterioration sensor detects the degree of deterioration of the engine oil based on a pH value. The oil deterioration sensor includes a sensing section for housing therein a sensing element, and a mounting section for supporting the sensing section. The sensing section is inserted from below through an opening formed in a bottom portion of the oil pan, wherein the mounting section is secured to the bottom portion of the oil pan.

Also, Japanese Patent Application Laid-open No. 11-30115 discloses an oil pan having a baffle plate disposed above the engine oil stored in the oil pan of an engine to suppress any turmoil occurring on the upper surface of the engine oil.

The oil deterioration sensor disclosed by JP '935 includes the sensing section housed in the oil pan and the mounting section exposed to an outside of the oil pan, wherein an oil hole for in-flowing and out-flowing engine oil to pass through is formed in a vicinity of a lower end portion of the sensing section, and an air hole for in-flowing and out-flowing air is formed in a vicinity of an upper end portion of the sensing section. Therefore, if the engine oil in the oil pan rampages and generates a splash, wherein the splashed oil enters the sensing section through the air hole, the level of engine oil in the sensing section changes, leading to a possibility that such a change detrimentally affects the detection accuracy.

SUMMARY OF THE INVENTION

The present invention has been achieved in view of the above-mentioned circumstances and has an aspect to prevent engine oil from entering an air hole of the oil sensor, thereby preventing the engine oil from detrimentally affecting the detection accuracy.

In order to achieve the above aspect, according to a first feature of the present invention, there is provided an oil pan for an engine located below a cylinder block of the engine to store engine oil in which an oil sensor for detecting a parameter of the engine oil is arranged, wherein an air hole in a sensing section of the oil sensor is covered with a shield member.

With the first feature, the air hole in the sensing section of the oil sensor is covered with the shield member. Therefore, the shield member prevents any splashed engine oil in the oil pan from entering the sensing section through the air hole, thereby enhancing the detection accuracy of the oil sensor.

According to a second feature of the present invention, there is provided an oil pan for an engine, which is located below a cylinder block of the engine to store engine oil, and in which an oil sensor for detecting a parameter of the engine oil is arranged, wherein a baffle plate covers a space above the engine oil stored in the oil pan. An air hole in a sensing section of the oil sensor is covered with a shield member extending downward from a lower surface of the baffle plate.

With the second feature, the oil sensor is covered with the baffle plate and the air hole in the sensing section of the oil sensor is covered with the shield member extending downward from the lower surface of the baffle plate. Thus, any overheated or excited engine oil in the oil pan is suppressed by the baffle plate to prevent the oil from splashing, and any splashed engine oil is prevented from entering the sensing section through the air hole, thereby enhancing the detection accuracy of the oil sensor. Moreover, since the shield member is supported on the baffle plate, an additional component or member dedicated to support the shield member is not required.

According to a third feature of the present invention, in addition to the second feature, the shield member has a tubular portion surrounding the sensing section of the oil sensor.

With the third feature, the shield member has a tubular portion surrounding the sensing section of the oil sensor. Therefore, any splashed oil originating from the periphery of the oil sensor is reliably shielded by the shield member, thereby preventing the splashed oil from entering the air hole.

According to a fourth feature of the present invention, in addition to the third feature, a clearance for venting air is formed between the tubular portion of the shield member and the baffle plate.

With the fourth feature, the clearance for venting air is formed between the baffle plate and the tubular portion of the shield member for covering the air hole in the sensing section. Therefore, even if the lower end of the tubular portion is submerged in the engine oil and the tubular portion is sealed, the clearance prevents the internal pressure of the tubular portion from changing, thereby securing the detection accuracy of the oil sensor.

According to a fifth feature of the present invention, in addition to any of the first through fourth features, the shield member is arranged to shield the oil sensor from a balancer device arranged in the oil pan.

With the fifth feature, the shield member is arranged to shield the oil sensor from a balancer device provided in the oil pan. Therefore, the shield member reliably blocks any splashed oil generated by operating the balancer device, thereby preventing the splashed oil from entering the air hole.

An oil level sensor of an embodiment discussed below corresponds to the oil sensor of the present invention.

The above-mentioned aspect, other aspects, characteristics, and advantages of the present invention will become apparent from a preferred embodiment which will be described in detail below by reference to the attached drawings.

DESCRIPTION OF THE PREFERRED EMBODIMENT

Figure 1:
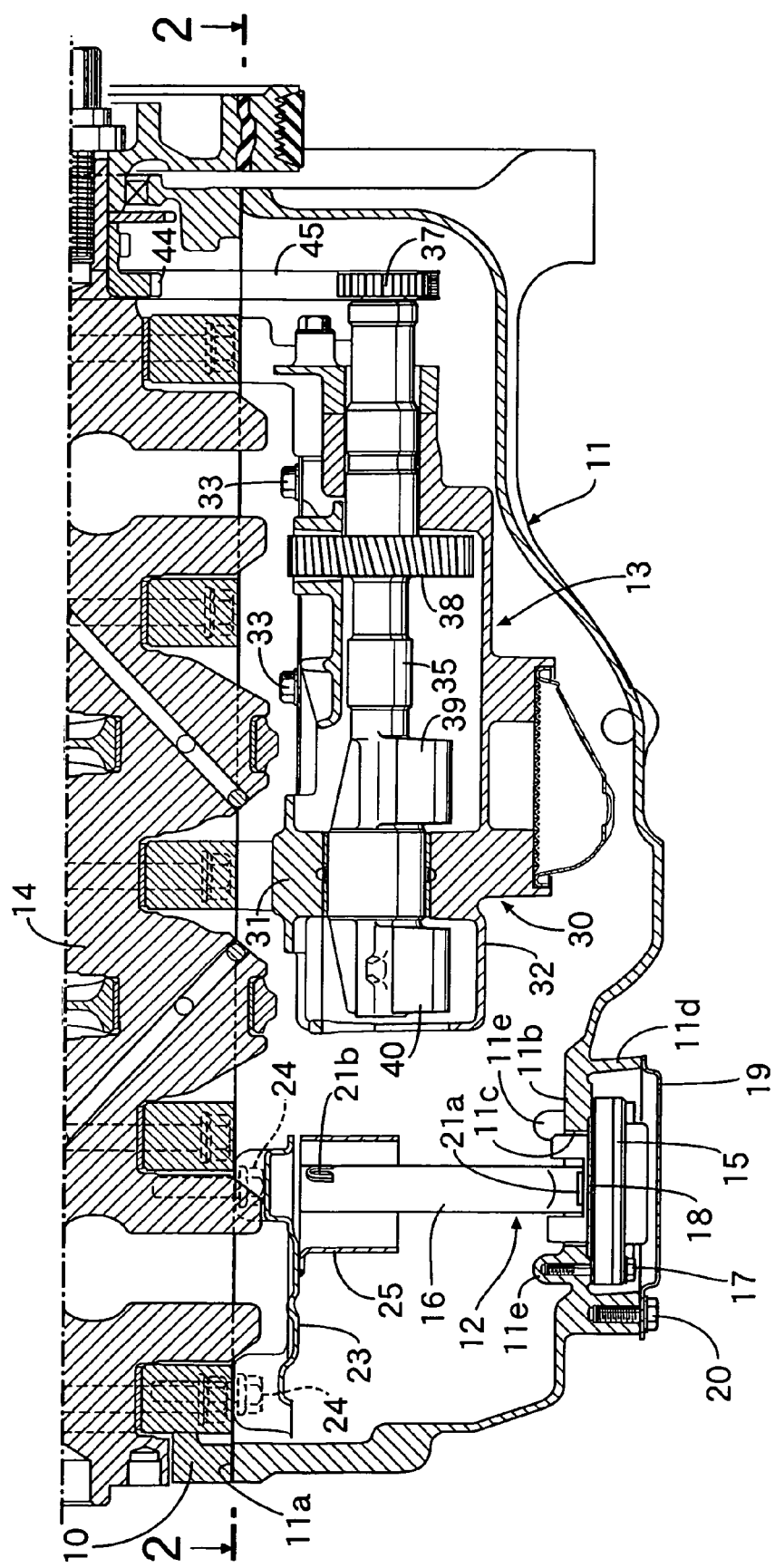
FIG. 1 is a longitudinal sectional view of a cylinder block and an oil pan of an in-line four-cycle diesel engine accord

As is apparent from FIG. 1, an oil pan 11 is attached to a lower surface of a cylinder block 10 of an automobile diesel engine. The oil pan 11 is a vessel-shaped member having, along a peripheral edge of an upper surface opening, a mounting surface 11a for mounting the oil pan 11 to the cylinder block 10. An oil level sensor 12, which detects the oil level in the oil pan 11, is provided on one end side of the oil pan 11 in the longitudinal direction. A balancer device 13 is provided on the other end side of the oil pan 11 in the longitudinal direction. A crankshaft 14 is rotatably supported on the cylinder block 10.

Figure 2:
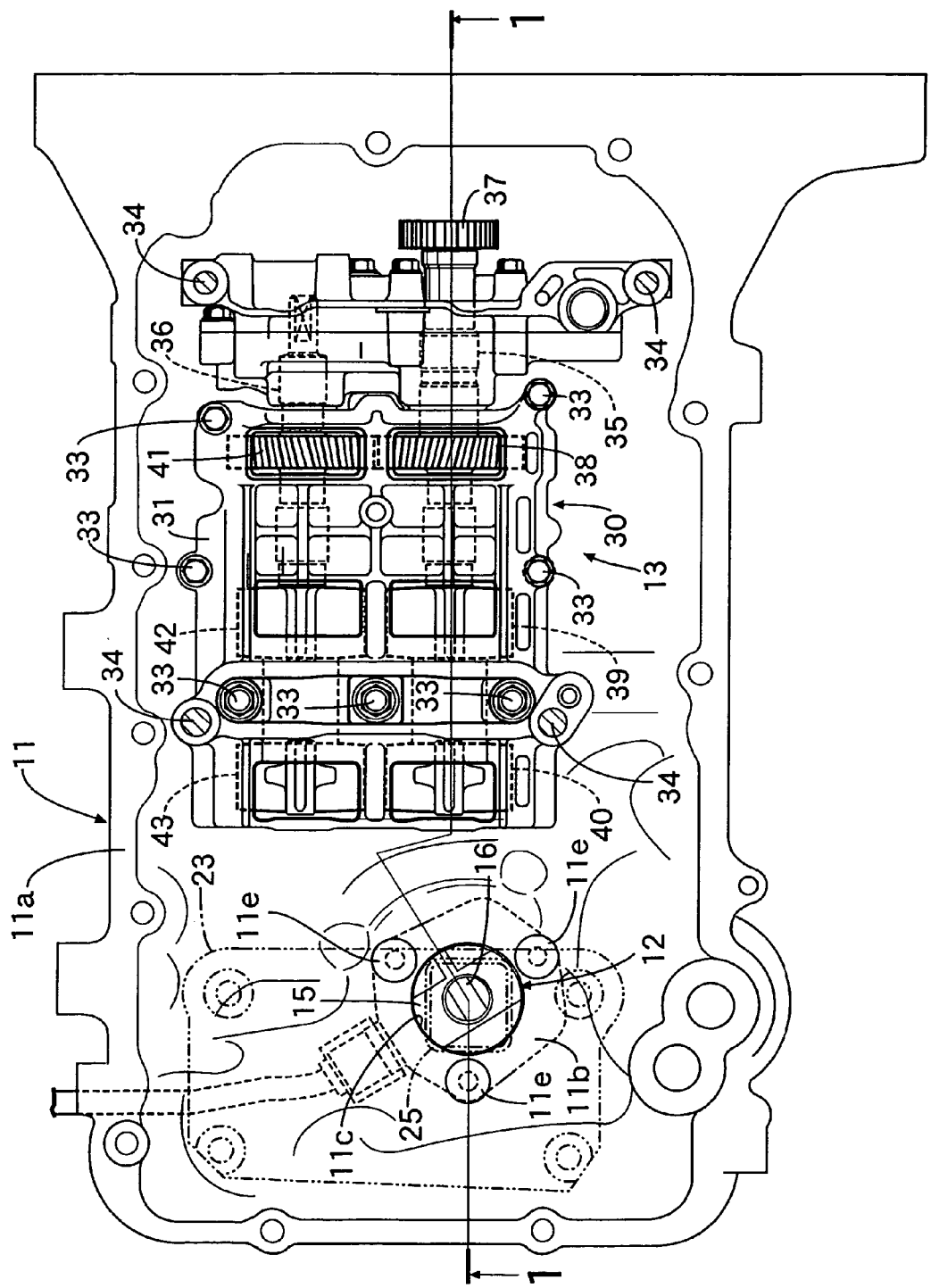
- FIG. 2 is a view showing the upper surface of the oil pan, which is a sectional view taken along line 2-2 of FIG. 1.
Figure 3:
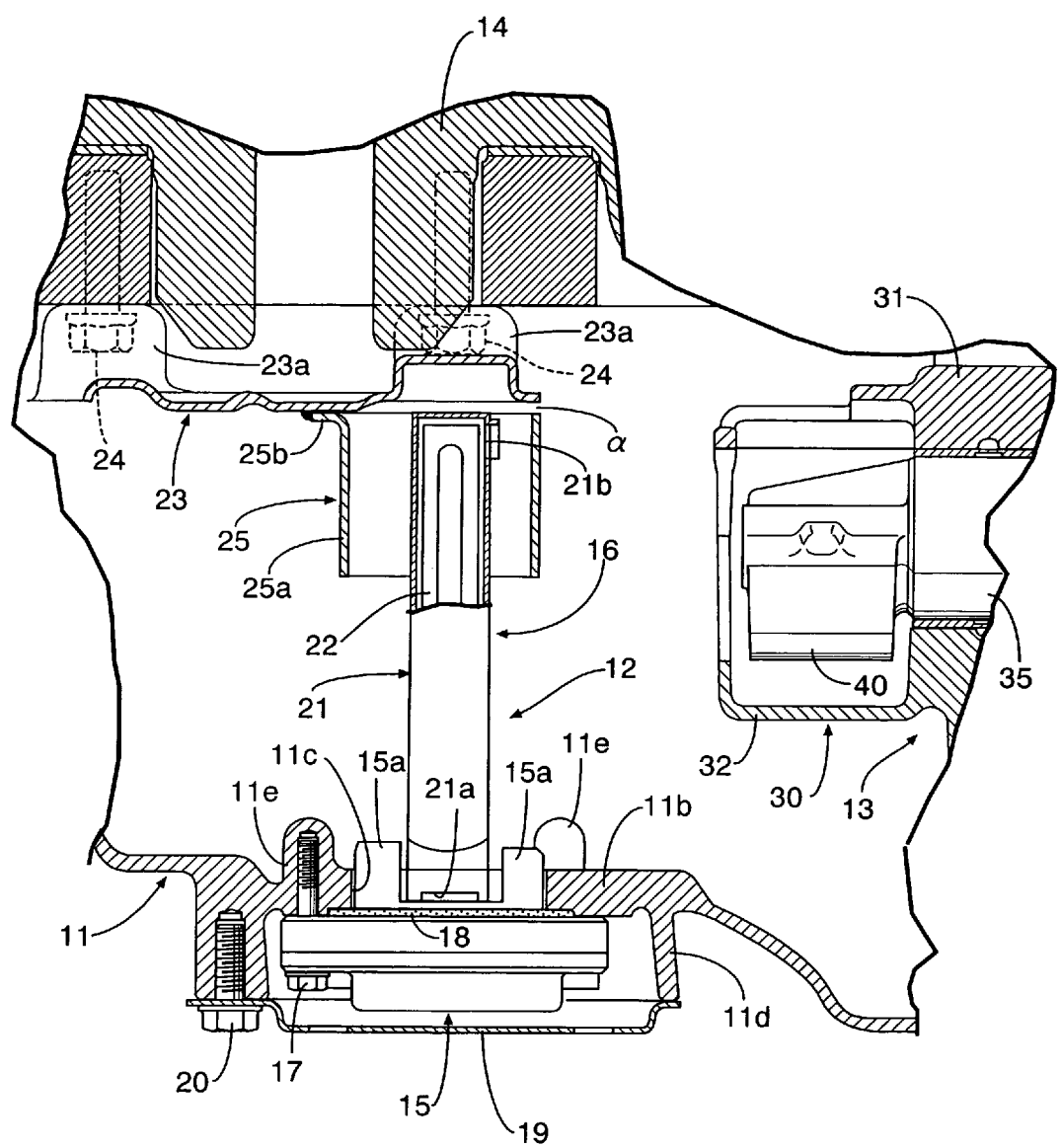
FIG. 3 is an enlarged view of a relevant portion of FIG. 1.

As is apparent from FIGS. 1 to 3, a circular sensor mounting opening 11c is formed in a center of a sensor mounting portion 11b of the oil pan 11. An annular rib 11d is projectingly provided on the lower surface of the oil pan 11 and surrounds the sensor mounting opening 11c. The oil level sensor 12 has a mounting section 15 shaped like a hexagonal box when observed in the plan view, and a tower-shaped sensing section 16 extending upward from the center of the mounting section 15. In a state in which the outer peripheral surfaces of three protrusions 15a, projectingly provided on the upper surface of the mounting section 15, are fitted to the sensor mounting opening 11c of the oil pan 11 and surround the sensing section 16, the oil level sensor 12 is fixed to the oil pan 11 by threadedly engaging three bolts 17 penetrating the mounting section 15 from below with three bosses 11e surrounding the periphery of the sensor mounting opening 11c. At this time, a seal member 18, which prevents leakage of engine oil, is held between the lower surface of the outer peripheral portion of the sensor mounting opening 11c and the upper surface of the mounting section 15 of the oil level sensor 12. A plate-shaped cover plate 19 abuts a lower end of the annular rib 11d projectingly provided on the lower surface of the oil pan 11 and is fixed thereto with at least one bolt 20.

The sensing section 16 of the oil level sensor 12 has a hollow cover member 21. An oblong slit-shaped oil hole 21a is formed at the lower end of the cover member 21 and communicates with the engine oil in the oil pan 11. An air hole 21b is formed at the upper end of the cover member 21 and communicates with the air in the oil pan 11. Therefore, the oil level in the cover member 21 of the sensing section 16 moves up and down to coincide with the oil level in the oil pan 11.

A plate-shaped sensing element 22 is provided inside the cover member 21 of the sensing section 16 of the oil level sensor 12. The sensing element 22 is energized to generate heat by which the sensing element 22 is heated to a temperature, for example, 10° C. higher than the oil temperature. Thereafter, the time taken for the temperature of the sensing element 22 to decrease, for example, by 5° C., is measured. When the oil level is high, the heat dissipating from the sensing element 22 to the engine oil is accelerated, wherein the temperature decreases rapidly. Inversely, when the oil level is low, the heat dissipating from the sensing element 22 to the engine oil is suppressed, wherein the temperature decreases slowly. With the above-described structural arrangement, the oil level in the oil pan 11 is accurately detected.

Cup-shaped mounting portions 23a are formed at the corners of a baffle plate 23 defined by a rectangular plate material. The cup-shaped mounting portions 23a are fastened to the lower surface of the cylinder block 10 with bolts 24 that penetrate the mounting portions 23a from below. A shield member 25 that covers the upper end portion of the sensing section 16 of the oil level sensor 12 includes a tubular portion 25a, having a square cross section, and a connecting portion 25b that is formed by bending the upper end portion of the tubular portion 25a. The connecting portion 25b is fixed, by brazing, to the lower surface of the baffle plate 23. In this state, a slit-shaped clearance a (see FIG. 3) is formed between the upper end of the tubular portion 25a and the lower surface of the baffle plate 23. Since the shield member 25 is supported by the baffle plate 23, an additional support member or component is unnecessary.

By fixing the baffle plate 23 to the cylinder block 10 with the bolts 24, the tubular portion 25a of the shield member 25 is arranged to surround the outer periphery of the upper end of the sensing section 16 of the oil level sensor 12.

A housing 30 of the balancer device 13 is formed by connecting an upper housing 31 and a lower housing 32 together by a plurality of bolts 33, and the corners thereof are fixed to the lower surface of the cylinder block 10 with bolts 34. On the balancer housing 30, a driving balancer shaft 35 and a driven balancer shaft 36 are supported in parallel with each other. On the driving balancer shaft 35, a follower sprocket 37, a driving gear 38, a first balancer weight 39, and a second balancer weight 40 are provided from one end side toward the other end side. On the driven balancer shaft 36, a follower gear 41, a first balancer weight 42, and a second balancer weight 43 are provided from one end side toward the other end side.

An endless belt 45 is wound around a driving sprocket 44 provided on the crankshaft 14 as well as the follower sprocket 37 provided on the driving balancer shaft 35. The driving gear 38 provided on the driving balancer shaft 35 meshes with a follower gear 41 provided on the driven balancer shaft 36.

The rotation of the crankshaft 14 is transmitted to the driving balancer shaft 35 through the driving sprocket 44, the endless belt 45 and the follower sprocket 37 by operating the engine. The rotation of the driving balancer shaft 35 is transmitted to the driven balancer shaft 36 via the meshing driving gear 38 and follower gear 41. In this arrangement, the number of teeth of the driving sprocket 44 of the crankshaft 14 is set to be two times the number of teeth of the follower sprocket 37 of the driving balancer shaft 35, and the number of teeth of the driving gear 38 is set to be equal to the number of teeth of the follower gear 41. Therefore, the driving balancer shaft 35 and the driven balancer shaft 36 rotate in directions opposite to each other at a rotating speed that is two times the rotating speed of the crankshaft 14, wherein 2-order vibration of the engine is reduced by the first and second balancer weights 39, 40; 42, 43 provided on the driving balancer shaft 35 and the driven balancer shaft 36.

Since the baffle plate 23 is arranged to extend in parallel with the space above the surface of the engine oil stored in the oil pan 11, any turmoil on the upper surface of the engine oil is suppressed by the baffle plate 23. However, even if the baffle plate 23 is provided, any such turmoil on the surface of the engine oil cannot be completely suppressed. Splashed engine oil may enter the air hole 21*b* provided in the cover member 21 of the sensing section 16 of the oil level sensor 12, by which the level of engine oil in the cover member 21 is fluctuated, which may make it difficult to accurately detect the oil level.

However, according to this embodiment of the present invention, since the periphery of the upper end portion of the cover member 21, having the air hole 21*b*, is covered with the tubular portion 25*a* of the shield member 25, any splashed engine oil is effectively prevented from entering the air hole 21*b*. In particular, when the first and second balancer weights 39, 40; 42, 43 provided on the driving balancer shaft 35 and the driven balancer shaft 36 of the balancer device 13 rotate, the engine oil becomes liable to splash out of the balancer housing 30 through any one of a large number of openings. However, in this embodiment, since the tubular portion 25*a* of the shield member 25 is arranged to shield the cover member 21 of the sensing section 16 from the balancer device 13, any splashing oil generated by the balancer device 13 is reliably blocked.

If the upper end opening portion of the tubular portion 25*a* of the shield member 25 is in close contact with the lower surface of the baffle plate 23 without any gap therebetween, air would be trapped in the internal space of the tubular portion 25*a* when the lower end opening portion of the tubular portion 25*a* is submerged under the surface of engine oil and the pressure in the internal space would fluctuate according to the fluctuation of the surface of the engine oil. Accordingly, the internal pressure of the cover member 21, communicating with the internal space through the air hole 21*b*, also changes, which fluctuates the level of the engine oil in the cover member 21, thereby lowering the detection accuracy of the oil level sensor 12.

However, according to this embodiment, since a narrow clearance α is formed between the upper end opening portion of the tubular portion 25*a* of the shield member 25 and the lower surface of the baffle plate 23, air is prevented from being trapped in the internal space of the tubular portion 25*a* which prevents the splashed oil from entering the clearance α, and the decrease in detection accuracy of the oil level sensor 12 is avoided.

Although the embodiment of the present invention has been described in detail, the present invention is not limited to the above-described embodiment, and various modifications in design may be made without departing from the subject matter of the invention.

For example, in this embodiment, the oil level sensor 12 for detecting the level of engine oil has been described, but the present invention is applicable to any oil sensor for detecting the temperature or deterioration of engine oil.

What is claimed is:

1. An oil pan located below a cylinder block of an engine to store engine oil therein, wherein an oil sensor is provided for detecting a parameter of the engine oil and has a sensing section which comprises a sensing element and a cover member covering the sensing element, the sensing section is arranged inside the oil pan, wherein the oil pan comprises:
   a shield member encompassing a part of the cover member; and
   an air hole is defined in the cover member of the oil sensor and is in open communication with an interior of the oil pan, wherein the air hole is encompassed by and directly opposes the shield member.

2. The oil pan according to claim 1, wherein the shield member is arranged to shield the oil sensor from a balancer device arranged in the oil pan.

3. The oil pan according to claim 1, wherein the shield member and cover member are coaxially arranged relative to each other.

4. An oil pan located below a cylinder block of an engine to store engine oil therein, wherein an oil sensor is provided for detecting a parameter of the engine oil and has a sensing section which comprises a sensing element and a cover member covering the sensing element, the sensing section is arranged inside the oil pan and a baffle plate is arranged in the oil pan to cover a space above the engine oil stored in the oil pan, wherein the oil pan comprises:
   a shield member encompassing a part of the cover member; and
   an air hole is defined in the cover member of the oil sensor and is in open communication with an interior of the oil pan, wherein the air hole is encompassed by and directly opposes the shield member, and
   wherein the shield member extends downward from a lower surface of the baffle plate.

5. The oil pan according to claim 4, wherein the shield member has a tubular portion surrounding the sensing section of the oil sensor.

6. The oil pan according to claim 5, wherein a clearance (α) for venting air is formed between the tubular portion of the shield member and the baffle plate.

7. The oil pan according to claim 6, wherein the shield member is arranged to shield the oil sensor from a balancer device arranged in the oil pan.

8. The oil pan according to claim 5, wherein the shield member is arranged to shield the oil sensor from a balancer device arranged in the oil pan.

9. The oil pan according to claim 5, wherein the tubular portion of the shield member is connected to the baffle plate.

10. The oil pan according to claim 4, wherein the shield member is arranged to shield the oil sensor from a balancer device arranged in the oil pan.

11. The oil plan according to claim 4, wherein the shield member and the cover member are coaxially arranged relative to each other.

* * * * *